United States Patent [19]

Maeda et al.

[11] Patent Number: 5,407,619
[45] Date of Patent: Apr. 18, 1995

[54] PROCESS FOR PREPARING A FIBER PRECURSOR OF METAL COMPOUND, AND A PROCESS FOR PREPARING A FIBER OF METAL

[75] Inventors: Hiroshi Maeda, Kitakyushu; Mamoru Shoji, Joetsu, both of Japan

[73] Assignee: Mitsubishi Kasei Corporation, Tokyo, Japan

[21] Appl. No.: 131,686

[22] Filed: Oct. 6, 1993

Related U.S. Application Data

[62] Division of Ser. No. 817,346, Jan. 6, 1992, Pat. No. 5,286,182.

[30] Foreign Application Priority Data

| Jan. 17, 1991 | [JP] | Japan | 3-17108 |
| Dec. 18, 1991 | [JP] | Japan | 3-353735 |

[51] Int. Cl.⁶ .................................................. C04B 35/64
[52] U.S. Cl. .................................. 264/63; 264/56; 264/211.11; 264/DIG. 19
[58] Field of Search ............. 264/63, 211.11, DIG. 19, 264/56

[56] References Cited

U.S. PATENT DOCUMENTS

| 3,379,811 | 4/1968 | Hartmann et al. | 264/DIG. 75 |
| 3,825,379 | 7/1974 | Lehkamp et al. | 425/72.2 |
| 3,912,439 | 10/1975 | Newman | 425/464 |
| 3,954,361 | 5/1976 | Page | 425/72.2 |
| 3,985,481 | 10/1976 | Brackmann et al. | 425/72.2 |
| 4,013,816 | 3/1977 | Sabee et al. | 264/DIG. 75 |
| 4,064,605 | 12/1977 | Akiyama et al. | 425/66 |
| 4,380,570 | 4/1983 | Schwarz | 425/80.1 |
| 4,826,415 | 5/1989 | Mende | 264/12 |
| 5,017,112 | 5/1991 | Mende | 264/177.13 |
| 5,160,746 | 11/1992 | Dodge | 425/72.2 |

FOREIGN PATENT DOCUMENTS

| 0206634 | 12/1986 | European Pat. Off. |  |
| 0213629 | 3/1987 | European Pat. Off. |  |
| 49717 | 4/1983 | Taiwan, Prov. of China. |  |
| 440909 | 1/1936 | United Kingdom | 264/204 |
| 1360197 | 7/1974 | United Kingdom. |  |

*Primary Examiner*—James Derrington
*Attorney, Agent, or Firm*—Oblon, Spivak, McClelland, Maier & Neustadt

[57] ABSTRACT

A spinning nozzle for dry spinning a spinning solution containing a metal compound and an organic polymer compound by a blowing method. In the spinning nozzle, an air nozzle 6 is provided having a rectangular-prism-like slit which is formed by opposing inner surfaces, extending in parallel to each other. The opposing inner surfaces each include a projecting portion, which are formed at the front side of a pair of cover plates 1,1, with each of the projecting portions having a knife edge portion at its free end. Spinning solution supplying nozzles are composed of a plurality of linear pipes and are arranged in the air nozzle 6 in such a manner that they are in parallel to the parallel surfaces of the cover plates and project from the edges of the parallel surfaces. Air fed through a gas feeding port 5 and blown out as an air stream from the air nozzle 6, and streams of the spinning solution extruded from the spinning solution supplying nozzles form parallel streams. Further, the air stream in parallel to the spinning solution streams is sufficiently rectified so that it contacts the spinning solution. Accordingly, an amount of air used can be greatly reduced and fibers having excellent quality can be produced.

3 Claims, 5 Drawing Sheets

PROCESS FOR PREPARING A FIBER PRECURSOR OF METAL COMPOUND, AND A PROCESS FOR PREPARING A FIBER OF METAL

This is a division of application Ser. No. 07/817,346, filed on Jan. 6, 1992, now U.S. Pat. No. 5,286,182.

BACKGROUND OF THE INVENTION

The present invention relates to a spinning nozzle. More particularly, it relates to a spinning nozzle for dry spinning a spinning solution containing a metal compound and an organic polymer compound by a blowing method.

The method of dry spinning a spinning solution containing a metal compound and an organic polymer compound is known in, for instance, Japanese Examined Patent Publication No. 36726/1980 or Japanese Unexamined Patent Publication No. 289131/1986.

Such method is generally called as a precursory fiber forming method. Precursory fibers produced by the forming method are, then, calcined at a temperature ranging from 500° C. to 1300° C., whereby a final product such as alumina fibers, ceramic fibers or the like is produced.

In the dry spinning of the spinning solution by the blowing method, the structure of a spinning nozzle is extremely important.

Conventionally proposed precursory fiber forming methods are silent on the proposal of the structure of the spinning nozzle. Even in the above-mentioned publications, there is only description that fibers are extruded through slits or orifices, and there is no concrete description on the structure of the spinning nozzle.

It is an object of the present invention to eliminate various problems in conventional techniques for dry spinning a spinning solution by using a blowing method, and to provide a spinning nozzle of a specified structure capable of producing fibers having excellent quality and improving greatly energy cost (i.e. an air quantity used) which was a problem in the conventional techniques.

SUMMARY OF THE INVENTION

In accordance with the present invention, there is provided a spinning nozzle for dry spinning a spinning solution containing a metal compound and an organic polymer compound by a blowing method, said spinning nozzle being characterized by comprising vertically arranged two cover plates each having a knife edge, a rectangular-prism-like slit formed between said two cover plates, and a plurality of spinning solution supplying nozzles, each being formed of a linear pipe, which are disposed in said slit se that said nozzles are extended in parallel to opposing surfaces of the slit and are projected from the space of the slit.

Further, in accordance with the present invention, there is provided a process for preparing fibers of a metal compound with use of the spinning nozzles described above.

DESCRIPTION OF THE PREFERRED EMBODIMENTS

Preferred embodiments of the spinning nozzle according to the present invention will be described with reference to the drawings.

Figure 1:
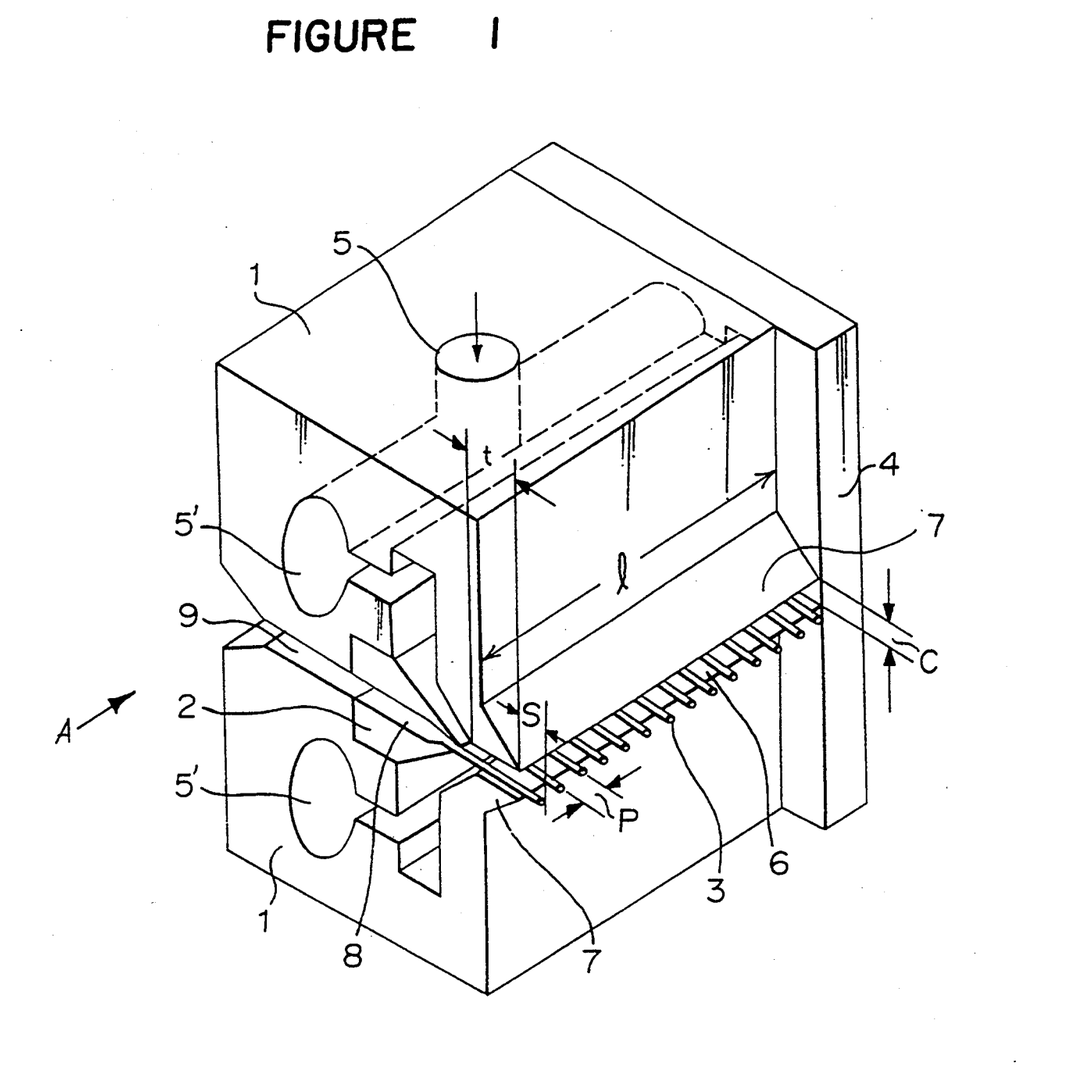
FIG. 1 is a diagram showing an embodiment of the spinning nozzle according to the present invention.

FIG. 1 is a diagram showing an embodiment of the spinning nozzle of the present invention. The spinning nozzle is mainly composed of a cover plates 1, a spinning solution supplying mount 2, spinning solution supplying nozzles 3 and side plates 4. FIG. 1 is shown in such a manner that the spinning nozzle is broken in a plane perpendicular to the longitudinal direction of the cover plates 1 in which the cover plate to be disposed at the left side of the spinning nozzle is not shown.

The cover plates 1 are so arranged that they are vertically overlaid interposing the spinning solution supplying mount 2 therebetween. A gas chamber 5' is formed in each of the cover plates 1. A plurality of air nozzles 6 are disposed at the front portion of the cover plates which are vertically arranged. A gas introducing port 5 is formed in each of the upper portion of the upper cover plate and the lower portion of the lower cover plate so that gas can be introduced into the respective gas chambers 5'.

Each of the gas chambers 5' comprises a cylindrical space formed in the longitudinal direction of each of the cover plates 1, a horizontal space formed along the longitudinal axis of the cylindrical space, a vertical space formed a side of the horizontal space and an inclination space formed along the opened side of the vertical space, wherein a slanting surface of the spinning solution supplying mount 2 cooperates to form the inclination space. It is preferable that the cross-sectional area of the horizontal space is smaller than that of the vertical space in order that gas is uniformly fed in the longitudinal direction of the passage of the gas chamber 5'. Further, it is preferable that the inclination space in cross section is gradually decreased in the direction of gas flow. Further, a plurality of gas feeding ports are preferably formed in the longitudinal direction of the gas chamber 5'.

The air nozzle 6 is formed at an end face of the rectangular-prism-like slit (which is defined by a dimension l in the longitudinal direction, a dimension t in the short direction and a dimension c in the thickness direction in FIG. 1) which are formed by the vertically arranged two cover plates each having a knife edge 7. The dimension of thickness c of the slit and the length of projection t of the knife edge are respectively determined depending on conditions for spinning operations.

The spinning solution supplying mount 2 is defined by a rectangular-prism-like portion having the same dimension as the longitudinal direction of the cover plate 1 and a triangular slanting portion formed along the rectangular-prism-like portion. A spinning solution passage 8 is formed in the spinning solution supplying mount 2 so that it extends in the longitudinal direction of it and has both open ends: one opening at the end surface of the rectangular-prism-like portion and the other opening at the position near the pyramidal part of the slanting portion.

The spinning solution supplying mount 2 is so arranged between the vertically disposed cover plates 1,1 that the rectangular-prism-like portion of the spinning solution supplying mount is fitted to a fitting portion which is formed at the inner portion of the cover plates 1,1 and the opposite side of the horizontal space. The fitting portion of each of the cover plates 1 is flush with the edge portion of the spinning solution passage formed at the end surface of the rectangular-prism-like portion of the spinning solution supplying mount 2. Accordingly, a spinning solution passage 9 having the same width as the spinning solution passage formed in the spinning solution supplying mount 2 and an opening which opens at the backside of the spinning solution supplying mount 2 is formed between the upper and lower cover plates 1,1. The corner portions which oppose at the backside of the cover plates 1,1 are chamfered so that the opening of the spinning solution passage 9 is flared outwardly.

The opposing surfaces of the cover plates 1,1 which form the air nozzle 6 have the same height as mentioned before so that the surfaces are flush with each other. Further, the opposing surfaces give a parallel relation by means of the above-mentioned fitting portions of the cover plates 1 and the right-angled portions of the rectangular-prism-like portion of the spinning solution supplying mount 2 which is to be fitted to the fitting portions of the cover plates 1,1.

The spinning solution supplying nozzles 3 are composed of a plurality of linear pipes whose one ends are set up and fixed to the triangular pyramidal portion of the spinning solution supplying mount 2 so as to coincide with the direction of the top portion of the supplying mount. Further, the spinning solution supplying nozzles are arranged at the central portion of the rectangular-prism-like slit. Further, they are arranged in parallel to the opposing surfaces the rectangular-prism-like slit and are projected from the slit. The inner diameter d, the pitch p and the length of projection S of each of the spinning solution supplying nozzles 3 are determined depending on conditions for the spinning operations.

The side plate 4 is fixed to each side surface of the vertically arranged cover plates 1,1.

In the spinning nozzle according to the present invention, an air stream blown out from the air nozzle 6 and spinning solution streams extruded from the spinning solution supplying nozzles 3 constitute parallel streams. Further, the air stream flowing in parallel to the spinning solution streams is sufficiently rectified and is brought into contact with the spinning solution streams. The air nozzle 6 has a knife-edge-like free end at its discharging port, occurrence of vortices due to the air stream blown out can be prevented. Accordingly, in accordance with the spinning nozzle of the present invention, the spinning solution extruded from the spinning solution supplying nozzles 3 can be sufficiently stretched without resulting in a sprayed state (mist), hence there does not cause bonding of fibers. Accordingly, fibers having good quality can be obtained.

In the spinning nozzle of the present invention, the spinning solution supplying nozzles 3 can be arranged close to each other in the air nozzle 6. Accordingly the air stream from the air nozzle 6 can be effectively utilized. As a result, an amount of air to be used can be greatly reduced. Further, since the air stream is in a slit-like form, attenuation of gas speed can be prevented so that a stretching effect can be achieved over a long distance. Therefore, the initial speed of the air stream blown out from the air nozzle 6 can be reduced. From the above-mentioned viewpoint, reduction of an air quantity to be used can be achieved. Further, since the air nozzle 6 has the knife-edge-like free end, the air stream from the air nozzle 6 can effectively pull air from the surrounding space, whereby there is obtainable a sufficient amount of air necessary for the subsequent drying step.

In the spinning nozzle having the above-mentioned structure, the dimensions of each of the structural elements can be determined as desired. For instance, when the liquid quantity per single spinning liquid supplying nozzle 3 is 1-120 ml/h, preferably 5-50 ml/h, and the gas speed at the slit portion of the air nozzle 6 is 10-200 m/s, preferably 20-100 m/s, a typical dimensional relation is as follows.

(1) The inner diameter d of the spinning solution supplying nozzle 3

$d = 0.1 - 0.5$ mm (2) The length of projection s of the spinning solution supplying nozzle 3

$s = 10\,d - 100\,d$ (3) The pitch p of the spinning solution supplying nozzle 3

Figure 2:
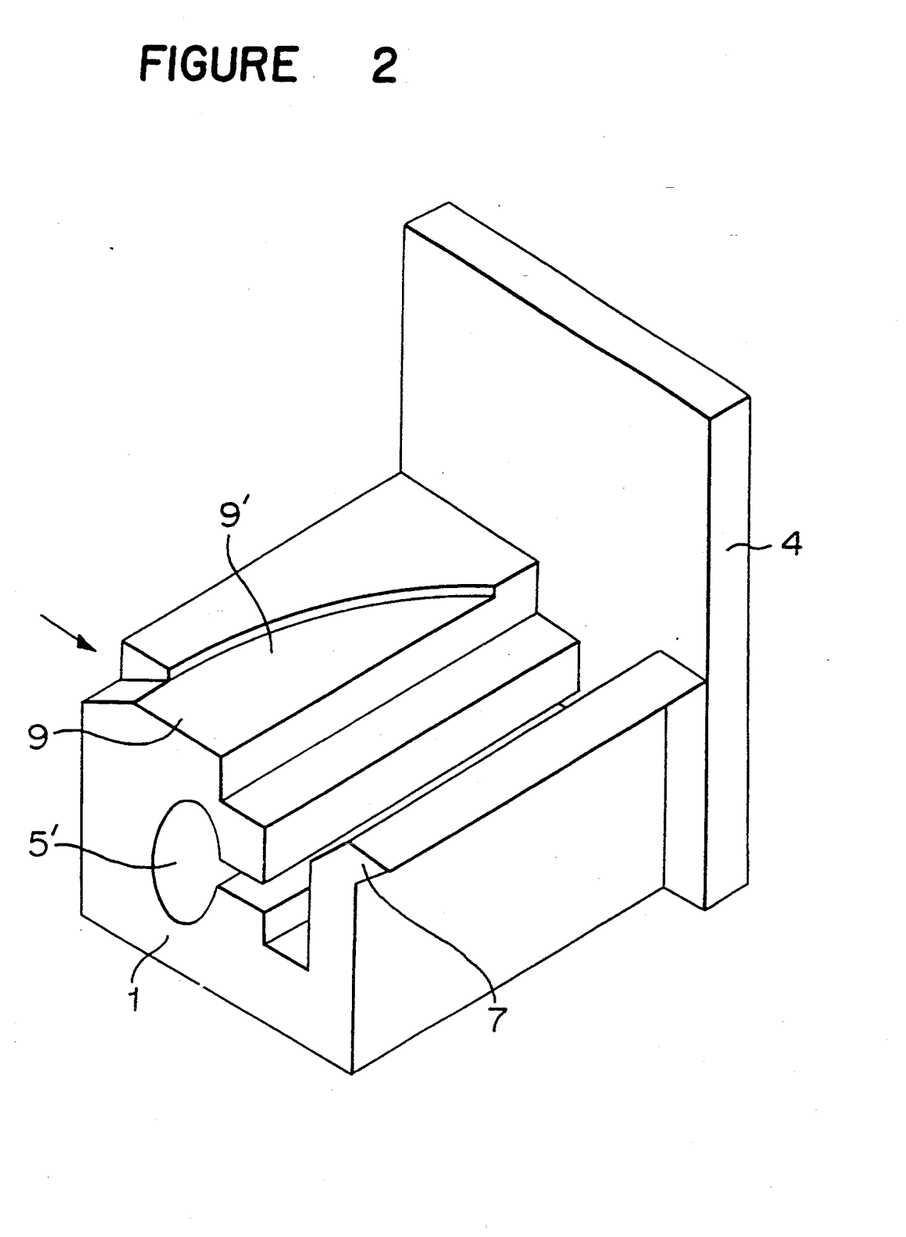
FIG. 2 is a diagram showing a lower cover plate and a side plate which are structural elements of the spinning nozzle shown in FIG. 1.

$p = 3\,d - 10\,d$ (4) The gap c of the slit portion of the air nozzle, i.e. the length in the thickness direction of the rectangular-prism-like slit $c = 3\,d - 20\,d$ (5) The length t of projection of the parallel surfaces of the air nozzle 6, i.e. the length in the transversal direction of the rectangular-prism-like slit $t = 2\,c - 80\,c$ FIG. 2 is a diagram showing the spinning nozzle shown in FIG. 1 in which the upper cover plate 1 and the spinning solution supplying mount 2 are removed, and only the lower cover plate and a side plate are shown. It can be seen in FIG. 2 that the spinning solution can be uniformly supplied to each of the spinning solution supplying nozzles 3, and the spinning solution passage 9 has a flared portion 9' which smoothly spreads toward the spinning solution supplying mount 2 without causing a stagnating flow.

Figure 3:
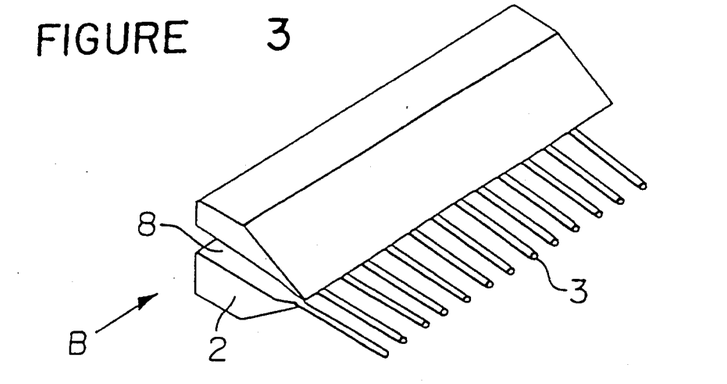
FIG. 3 is a diagram showing a spinning solution supplying mount used for the spinning nozzle shown in FIG. 1.

FIG. 3 is a diagram showing the spinning solution supplying mount 2 attached with the spinning solution supplying nozzles 3.

Figure 4:
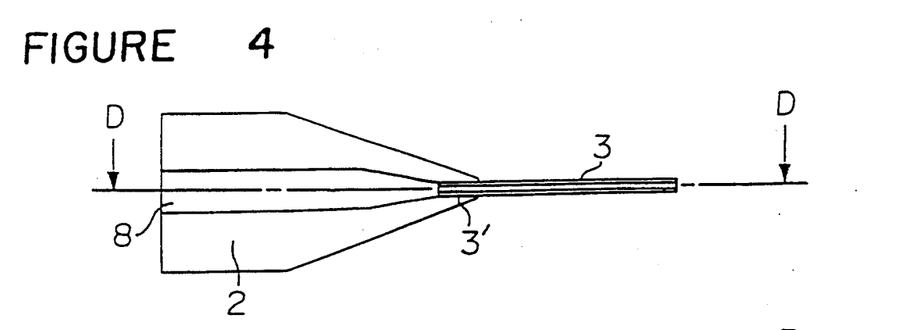
FIG. 4 is a side view of the spinning solution supplying mount viewed from the B direction in FIG. 3.

FIG. 4 is a side view of the spinning solution supplying mount 2 in view from the direction B in FIG. 3. The spinning solution supplying nozzles 3 are fixed to the spinning solution supplying mount 2 by inserting each one end thereof to fitting portions 3' of the supplying mount 2. The spinning solution passage 8 is formed so as to penetrate the central portion of the spinning solution supplying mount 2.

Figure 5:
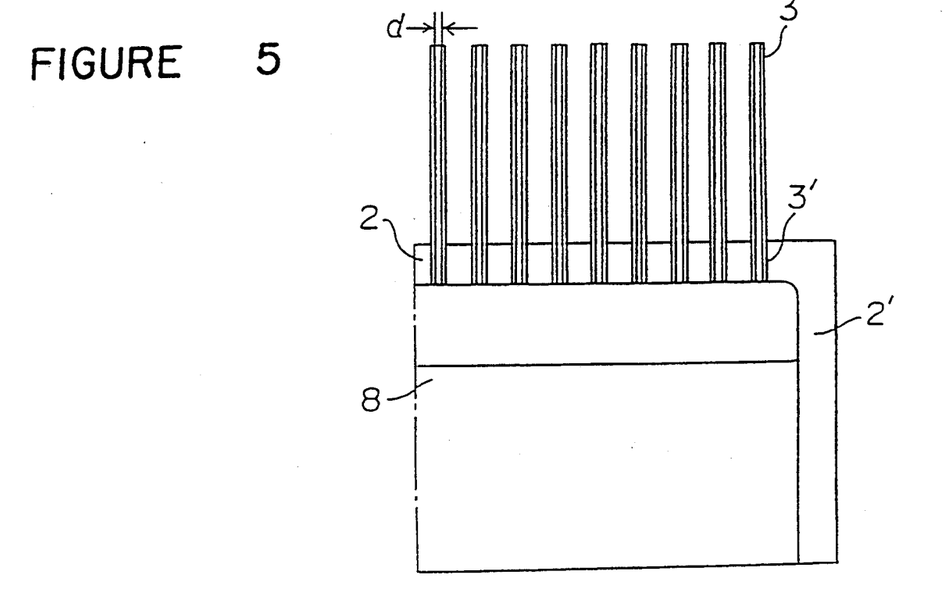
FIG. 5 is a cross-sectional view taken along a line D—D in FIG. 4.

FIG. 5 is a cross-sectional view of the spinning solution supplying mount 2 taking along a line D—D in FIG. 4. It is found in FIG. 5 that there is formed an end portion 2' in the spinning solution supplying mount without extending the spinning solution passage 8 to the end portion in order that the strength of the spinning solution supplying mount 2 can be maintained and leakage of the spinning solution from an end in the longitudinal direction of the spinning solution supplying mount 2 can be prevented.

Figure 6:
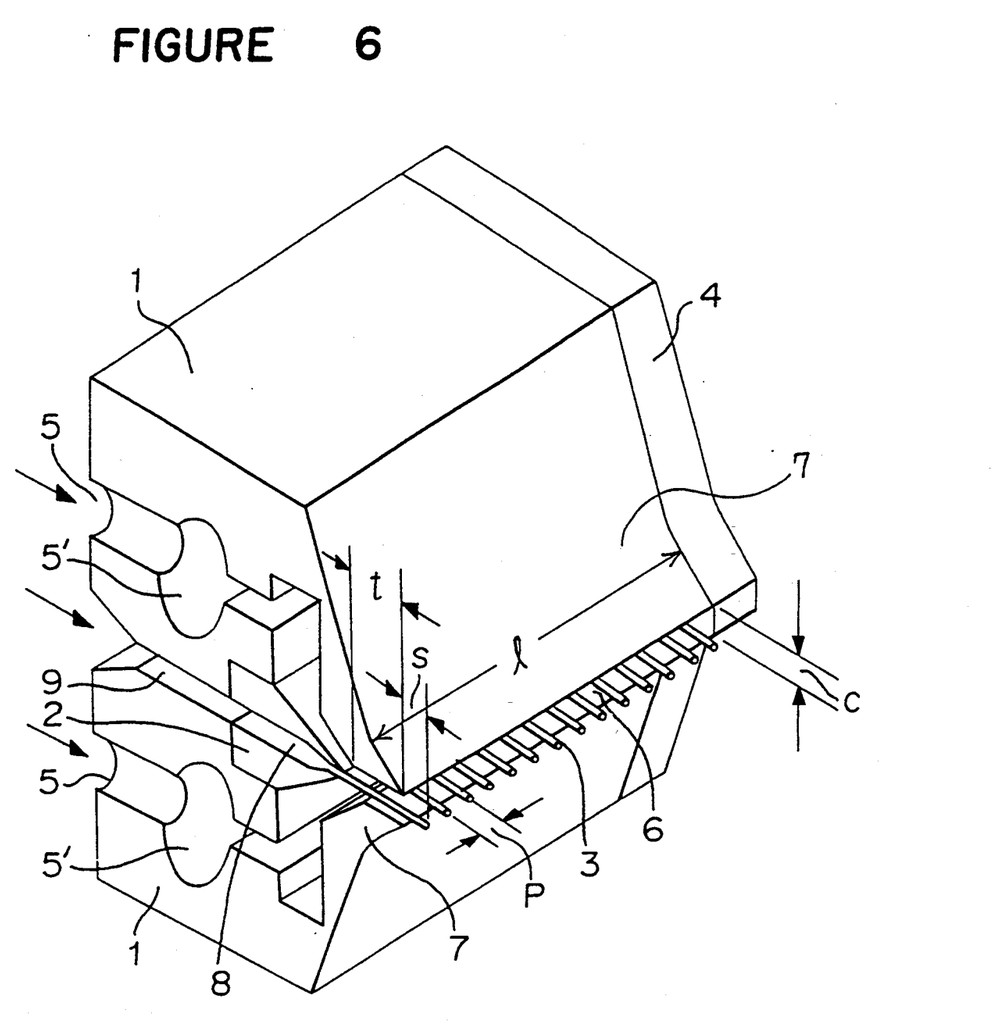
FIG. 6 is a diagram showing another embodiment of the spinning nozzle according to the present invention.

FIG. 6 is a diagram showing another embodiment of the spinning nozzle according to the present invention. This embodiment aims that ambient air to be accompanied with the air stream blown out from the air nozzle 6 can be effectively entrained from the ambient space without causing any disturbance. For this purpose, the cover plates 1 and the side plates 4 are respectively formed to have inclined portions so as to be along the air stream to be accompanied with. Further, a gas introducing port 5 is formed at the backside of the spinning nozzle.

Figure 7:
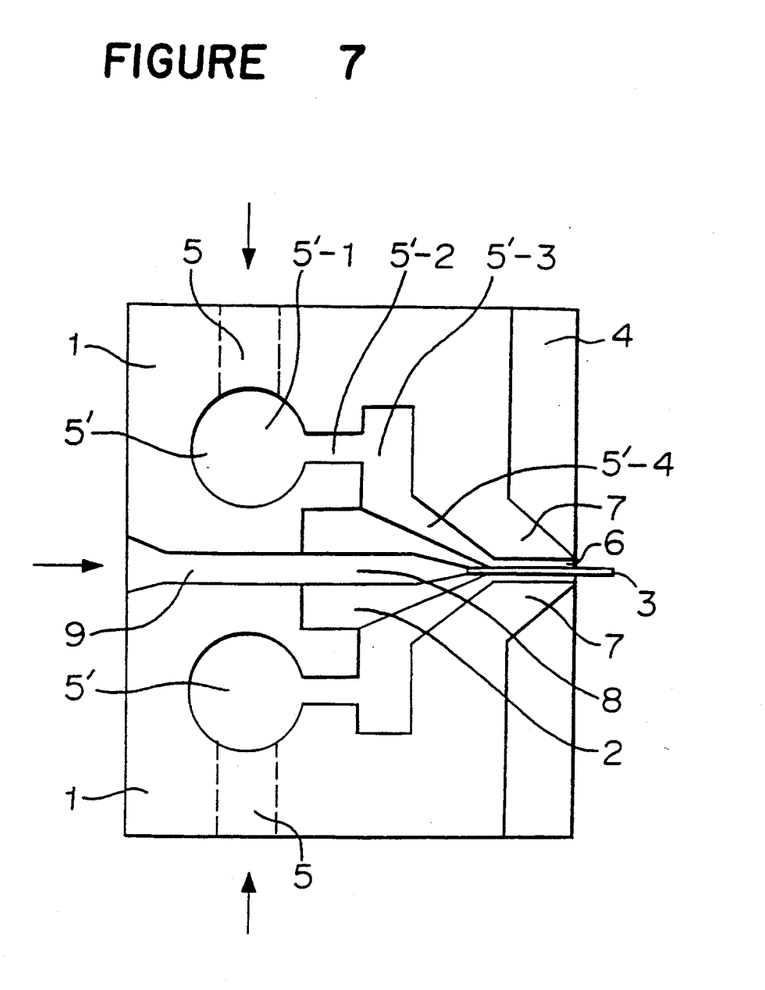
FIG. 7 is a side view of the spinning nozzle viewed from the A direction in FIG. 1.

FIG. 7 is a diagram showing the spinning nozzle which is viewed from the direction A in FIG. 1. With reference to FIG. 7, detailed description will be made as to the gas chamber 5'. The gas chamber 5' comprises a cylindrical space 5'-1 formed in the longitudinal direction of each of the cover plates 1, a horizontal space 5'-2 formed at a side and along the central axis of the cylindrical space 5'-1, a vertical space 5'-3 formed at a side of the horizontal space 5'-2 and an inclination space 5'-4 formed along the opening side of the vertical space 5'-3 and in association with the slanting portion of the spinning solution supplying mount 2. The inclination space 5'-4 has a passage in which the cross-sectional area of the passage is gradually reduced in the direction of the gas flow in order to rectify the gas discharged through the air nozzle 6 and to prevent the gas from blowing in the longitudinal direction of the nozzle.

The spinning nozzle of the present invention is used for dry spinning a spinning solution by using a conventional blowing method. The preparation of the spinning, the collecting of the spinned fiber, and the burning of the collected fiber can be conducted as desired in accordance with known techniques.

The spinning solution formed into fibers with use of the spinning nozzle of the present invention contains a metal compound and an organic polymer compound which are capable of forming fibers of inorganic oxide. As the metal compound, compounds capable of forming water solutions or colloidal solutions can be used. As such compounds, inorganic acid salt such as chloride, sulfate, nitrate or the like, organic acid salt such as acetate or the like and hydroxide, of metal such as aluminum, zirconium, silicon, magnesium, thorium, yttrium, calcium, chromium or the like. More specifically, there are aluminum oxychloride, basic aluminum acetate, zirconium oxychloride, basic zirconium acetate or the like. These compounds may be used solely or in combination.

The organic polymer compound can include water-soluble or water-dispersible polymers such as polyvinyl alcohol, polyethylene glycol, polyethylene oxide, polyacrylamide, starch, acetic acid-modified starch, hydroxyethyl starch, methyl cellulose, ethyl cellulose, hydroxyethyl cellulose, carboxymethyl cellulose or the like.

The spinning solution may be prepared depending on the nature of material and the object of fibers to be prepared. For instance, when alumina fibers are to be prepared, a silicon compound such as silica gel, tetraethylsilicate, water-soluble siloxane derivative or the like is added to aluminum oxychloride solution, an organic polymer compound such as polyvinyl alcohol is added to the mixture and the product is condensed to have a predetermined solid content.

The silicon compound and the organic polymer compound may be added during or after the condensation. In case of preparing alumina fibers, it is preferable that the ratio of an aluminum material to a silicon material in the original spinning solution is, when they are calculated as $Al_2O_3$ and $SiO_2$, in a range of 65–98% by weight of $Al_2O_3$ to the total amount, particularly in a range of 70–98% by weight.

The spinning solution is generally used by preparing it to have a viscosity in a range of 1–1000 poise, which is suitable for spinning. In spinning, sufficiently stretched fibers are formed from the spinning solution under conditions wherein evaporation of water content and decomposition of the spinning solution are suppressed, and then the fibers are rapidly dried. Namely, it is preferable that when the fibers are being supplied to a fiber collector after they have been formed from the spinning solution, there is a change from a state in which the evaporation of water is suppressed to a state in which the evaporation of water is accelerated.

If the ambient temperature is too high in a course that the sufficiently stretched fibers are formed from the spinning solution, it is difficult to obtain the sufficiently stretched fibers due to rapid evaporation of water. Further, there causes a defect in the thus formed fibers, and the fibers of inorganic oxide to be finally produced becomes brittle.

On the other hand, when fibers are formed from the spinning solution in a low temperature condition or a high moisture condition in order to suppress the evaporation of water, there causes mutual adhesion of fibers or there causes liquid drops due to recovery of resiliency to thereby easily cause a shot because the same atmosphere is maintained after the formation of the fibers. Such phenomena are apt to take place when the fibers are collected on the fiber collector although the phenomena takes place when the fibers float in the air stream. Accordingly, it is preferred to determine that the temperature of the atmosphere where the contact between the spinning solution and the air stream is initiated is in a range of 1°–20° C., the temperature of the air stream near the fiber collector is in a range of 25°–100° C. and relative humidity is 30% or less. The fibers collected by the fiber collector are calcined at 500° C. or higher, preferably, in a range of 700°–1400° C. When the calcining temperature is 500° C. or lower, only brittle fibers having a small strength are obtained. On the other hand, when the calcining temperature exceeds 1400° C., crystal growth appears in the fibers to thereby reduce the strength of the fibers. Further, needling or another treatment may be conducted to the fibers before the calcination, if desired.

EXAMPLES

In the following, the present invention will be explained in more detail with reference to Examples, although the present invention should not be restricted by these Examples.

In the Examples, a shot content is a value obtained by pressurizing and pulverizing fibers formed, classifying the pulverized fibers with use of a sieve having a 325 mesh size, and by measuring remained particles on the sieve. A bulk tensile strength is a value obtained by compressing the fibers laid to have a density of 0.1 g/cm$^3$ and by pulling it with a span of 40 mm.

EXAMPLE 1

279 g of 20 wt % silica gel solution and 315 g of 5 wt % polyvinyl alcohol aqueous solution were added to 1 l of aluminum oxychloride aqueous solution (aluminum content: 75 g/l and AL/CL (atomic ratio)=1.8) followed by mixing. The mixture was condensed at 50° C. under a reduced pressure to prepare spinning solution having a viscosity of 40 poise and alumina/silica 30 wt %.

The spinning solution was spun by a blowing method in which the spinning nozzle as shown in FIG. 1 was used. A fiber collector was set at a position about 4 m apart from the spinning nozzle and fibers thus formed were collected on the screen of the fiber collector. When the fibers were collected, warm air of 90° C. which was dried and air flows in parallel to a high speed air stream was fed to the screen, whereby an air stream near the fiber collector was adjusted to have a temperature of 35° C. and relative humidity of 30%.

Dimensions of the Spinning Nozzle Used (1) The inner diameter d of the spinning solution supplying nozzle 3: 0.3 mm
(2) The length of projection s of the spinning solution supplying nozzle 3: 10.0 mm
(3) The pitch p of the spinning solution supplying nozzle 3: 2.0 mm
(4) The number of the spinning solution supplying nozzles: 50
(5) The gap c of the slit portion of the air nozzle 6: 3.7 mm
(6) The length of the rectangular-prism-like slit in the short direction t: 20.0 mm
(7) The length of the rectangular-prism-like slit in the longitudinal direction l: 120 mm

Spinning Conditions (1) An amount of solution per single spinning solution supplying nozzle 3: 10 ml/h
(2) The velocity of air (at the slit portion of the air nozzle 6): 43 m/s (Pressure: 2 kg/cm$^2$, temperature: 18° C., relative humidity: 40%)

The collected fibers were calcined at 1260° C. for 1 hour to obtain alumina fibers having the physical properties described below.

The diameter of fibers: 4.2 μm
Shot content: 4 wt %
Bulk tensile strength: 1.0 kg/cm$^2$

COMPARATIVE EXAMPLE 1

Alumina fibers were prepared in the same manner as Example 1 except that the spinning nozzle as shown in FIG. 1 was modified such that the free end of each of the spinning solution supplying nozzles 3 are not projected from the rectangular-prism-like slit formed between the two cover plates 1,1.

It was found that the spinning solution was not smoothly sucked in an air stream, it became easily misted at the free ends of the nozzles 3 and it could not be elongated as a fibrous form. Further, the shot content of the alumina fibers obtained assumed a value as large as 10–30 wt %, and the value was fluctuated. Further, the bulk tensile strength was low as 0.4–0.6 kg/cm$^2$.

EXAMPLE 2

Alumina fibers were prepared by using the spinning solution used in Example 1 and were collected on the screen in the same manner as Example 1 except using the spinning nozzle as shown in FIG. 6 and except that the dimensions of the spinning nozzle and the spinning conditions were determined as follows.

Dimensions of the Spinning Nozzle Used (1) The inner diameter d of the nozzle 3: 0.3 mm
(2) The length of projection s of the nozzle 3: 5.0 mm
(3) The pitch p of the nozzle 3: 2.0 mm
(4) The number of the spinning solution supplying nozzle: 270
(5) The gap c of the slit portion of the air nozzle 6: 3.7 mm
(6) The length of the rectangular-prism-like slit in the short direction t: 20.0 mm
(7) The length of the rectangular-prism-like slit in the longitudinal direction l: 570 mm

Spinning Conditions (1) An amount of solution per single nozzle 3: 5 ml/h
(2) The velocity of air (at the slit portion of the air nozzle 6): 54 m/s (Pressure: 2 kg/cm$^2$, temperature: 18° C., relative humidity: 40%)

The collected fibers were calcined at 1260° C. for 1 hour to obtain alumina fibers having physical properties as described below.

The diameter of fibers: 6.6 μm
Shot content: 1 wt %
Bulk tensile strength: 1.8 kg/cm$^2$ Thus, since the spinning nozzle of the present invention has the specified structure described above, excellent fibers which are free from mutual adhesion of fibers, having uniform quality, little shot content and a large bulk tensile strength can be produced. Further, in accordance with the spinning nozzle of the present invention, the energy cost (an amount of air used) can be greatly reduced and fibers having excellent quality can be produced. Accordingly, the industrial value of the present invention is remarkable.

We claim:

1. A process for preparing a fiber precursor of a metal compound which comprises using a spinning nozzle means comprising a plurality of spinning solution supplying nozzles, each being formed of a linear pipe, which are disposed in a rectangular-prism-like slit formed by vertically arranged two cover plates each having a knife edge so that said nozzles are extended in parallel to opposing surfaces of said slit and are projected from the space of the slit, wherein said nozzles project within a projection range of 5 mm to 50 mm from the slit and extruding a spinning solution containing a metal compound and an organic polymer compound through said spinning solution supplying nozzles while air is blown through said rectangular-prism-like slit.

2. A process for preparing fibers of a metal compound which comprises calcining the fiber precursor claimed in claim 1 at a temperature from 700° C. to 1400° C.

3. A process for dry spinning a spinning solution for preparing a fiber precursor of a metal compound which comprises utilizing a spinning nozzle arrangement comprising a plurality of spinning solution supplying nozzles, each being formed of a linear pipe, which are disposed in a rectangular-prism-like slit formed by vertically arranged two cover plates each having a knife edge such that said nozzles are extended in parallel to opposing surfaces of said slit and are projected from the space of the slit and extruding a spinning solution containing a metal compound and an organic polymer compound through said spinning solution supplying nozzles while air is blown through said rectangular-prism-like slit, and wherein the method includes disposing said nozzles such that they project sufficiently from the space of said slit to allow an air stream formed by the air blown through said rectangular prism-like slit to rectify such that the spinning solution is smoothly drawn into the air stream, and wherein said nozzles project within in a projection range of 5 mm to 50 mm from the slit.

* * * * *